(12) United States Patent
Chan

(10) Patent No.: US 11,205,957 B2
(45) Date of Patent: Dec. 21, 2021

(54) BOOST CONVERTER

(71) Applicant: Acer Incorporated, New Taipei (TW)

(72) Inventor: Tzu-Tseng Chan, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 16/845,177

(22) Filed: Apr. 10, 2020

(65) Prior Publication Data
US 2021/0175797 A1 Jun. 10, 2021

(30) Foreign Application Priority Data
Dec. 4, 2019 (TW) ................... 108144241

(51) Int. Cl.
H02M 3/155 (2006.01)
H02M 1/00 (2006.01)
H02M 3/00 (2006.01)

(52) U.S. Cl.
CPC ......... *H02M 3/155* (2013.01); *H02M 1/0058* (2021.05); *H02M 3/01* (2021.05)

(58) Field of Classification Search
CPC ....... H02M 1/0058; H02M 2001/0058; H02M 1/34; H02M 1/384; H02M 2001/384; H02M 3/01; H02M 3/155–1588
See application file for complete search history.

(56) References Cited

U.S. PATENT DOCUMENTS

| 5,543,704 A * | 8/1996 | Thoren | H02M 3/158 323/222 |
| 5,594,635 A * | 1/1997 | Gegner | H02M 3/337 363/124 |
| 5,736,841 A * | 4/1998 | Gucyski | H02M 3/158 323/222 |

(Continued)

FOREIGN PATENT DOCUMENTS

| CN | 103091534 A | 5/2013 |
| CN | 107769541 A | 3/2018 |

(Continued)

OTHER PUBLICATIONS

Chinese language office action dated Jun. 5, 2020, issued in application No. TW 108144241.

*Primary Examiner* — Fred E Finch, III
(74) *Attorney, Agent, or Firm* — McClure, Qualey & Rodack, LLP

(57) ABSTRACT

A boost converter includes a first inductor, a first switch element, a second switch element, a tuning circuit, and an output stage circuit. A first parasitic capacitor is built in the first switch element. The first switch element selectively couples the first inductor to a ground voltage according to a first control voltage. A second parasitic capacitor is built in the second switch element. The second switch element selectively couples the first inductor to the output stage circuit according to a second control voltage. The tuning circuit includes a second inductor, a third inductor, and a (Continued)

discharge path. The first parasitic capacitor resonates with the second inductor and is coupled through the discharge path to the ground voltage, or the second parasitic capacitor resonates with the third inductor and is coupled through the discharge path to the ground voltage.

12 Claims, 4 Drawing Sheets

(56) References Cited

U.S. PATENT DOCUMENTS

| | | | | |
|---|---|---|---|---|
| 5,841,268 | A * | 11/1998 | Mednik | H03K 17/08142 323/222 |
| 5,977,754 | A * | 11/1999 | Cross | H02M 3/158 323/222 |
| 6,434,029 | B1 * | 8/2002 | Cyr | H02M 3/158 363/86 |
| 8,791,725 | B2 | 7/2014 | Tseng et al. | |
| 10,199,555 | B2 | 2/2019 | Chaput | |
| 2005/0226012 | A1 * | 10/2005 | Jovanovic | H02M 3/335 363/59 |
| 2006/0262577 | A1 * | 11/2006 | Schenk | H02M 1/34 363/50 |
| 2008/0278130 | A1 * | 11/2008 | Ito | H02M 1/34 323/282 |
| 2015/0180340 | A1 | 6/2015 | Ernest et al. | |
| 2017/0163163 | A1 * | 6/2017 | Jang | H02M 3/1582 |

FOREIGN PATENT DOCUMENTS

| | | |
|---|---|---|
| CN | 106992670 B | 7/2019 |
| TW | 201424232 A | 6/2014 |
| TW | 201539962 A | 10/2015 |

* cited by examiner

BOOST CONVERTER

CROSS REFERENCE TO RELATED APPLICATIONS

This application claims priority of Taiwan Patent Application No. 108144241 filed on Dec. 4, 2019, the entirety of which is incorporated by reference herein.

BACKGROUND OF THE INVENTION

Field of the Invention

The disclosure generally relates to a boost converter, and more specifically, to a boost converter with high output efficiency.

Description of the Related Art

In a conventional boost converter, each switch element may have a non-ideal parasitic capacitance. When the switch element is switched from a disable state into an enable state, it usually cannot achieve a perfect ZVS (Zero Voltage Switching) operation, thereby reducing the output efficiency of the boost converter. Accordingly, there is a need to propose a novel solution for solving the problems of the prior art.

BRIEF SUMMARY OF THE INVENTION

In a preferred embodiment, the invention is directed to a boost converter that includes a first inductor, a first switch element, a second switch element, a tuning circuit, and an output stage circuit. The first inductor receives an input voltage. A first parasitic capacitor is built in the first switch element. The first switch element selectively couples the first inductor to a ground voltage according to a first control voltage. The output stage circuit generates an output voltage. A second parasitic capacitor is built in the second switch element. The second switch element selectively couples the first inductor to the output stage circuit according to a second control voltage. The tuning circuit includes a second inductor, a third inductor, and a discharge path. The first parasitic capacitor resonates with the second inductor and is coupled through the discharge path to the ground voltage, or the second parasitic capacitor resonates with the third inductor and is coupled through the discharge path to the ground voltage.

In some embodiments, the first inductor has a first terminal coupled to an input node for receiving the input voltage, and a second terminal coupled to a first node.

In some embodiments, the first switch element includes a first transistor. The first transistor has a control terminal for receiving the first control voltage, a first terminal coupled to the ground voltage, and a second terminal coupled to the first node.

In some embodiments, the first parasitic capacitor has a first terminal coupled to the first node, and a second terminal coupled to the ground voltage.

In some embodiments, the output stage circuit includes a capacitor. The capacitor has a first terminal coupled to an output node for outputting the output voltage, and a second terminal coupled to the ground voltage.

In some embodiments, the second switch element includes a second transistor. The second transistor has a control terminal for receiving the second control voltage, a first terminal coupled to the output node, and a second terminal coupled to the first node.

In some embodiments, the second parasitic capacitor has a first terminal coupled to the first node, and a second terminal coupled to the output node.

In some embodiments, the second inductor has a first terminal coupled to the first node, and a second terminal coupled to a second node. The third inductor has a first terminal coupled to the first node, and a second terminal coupled to the second node.

In some embodiments, when the first transistor is enabled and the second transistor is disabled, the second parasitic capacitor resonates with the third inductor and is completely discharged via the discharge path. When the first transistor is disabled and the second transistor is enabled, the first parasitic capacitor resonates with the second inductor and is completely discharged via the discharge path.

In some embodiments, the discharge path includes a diode and a resistor. The diode has an anode coupled to the second node, and a cathode coupled to a third node. The resistor has a first terminal coupled to the third node, and a second terminal coupled to the ground voltage.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are described in detail as follows:

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1:
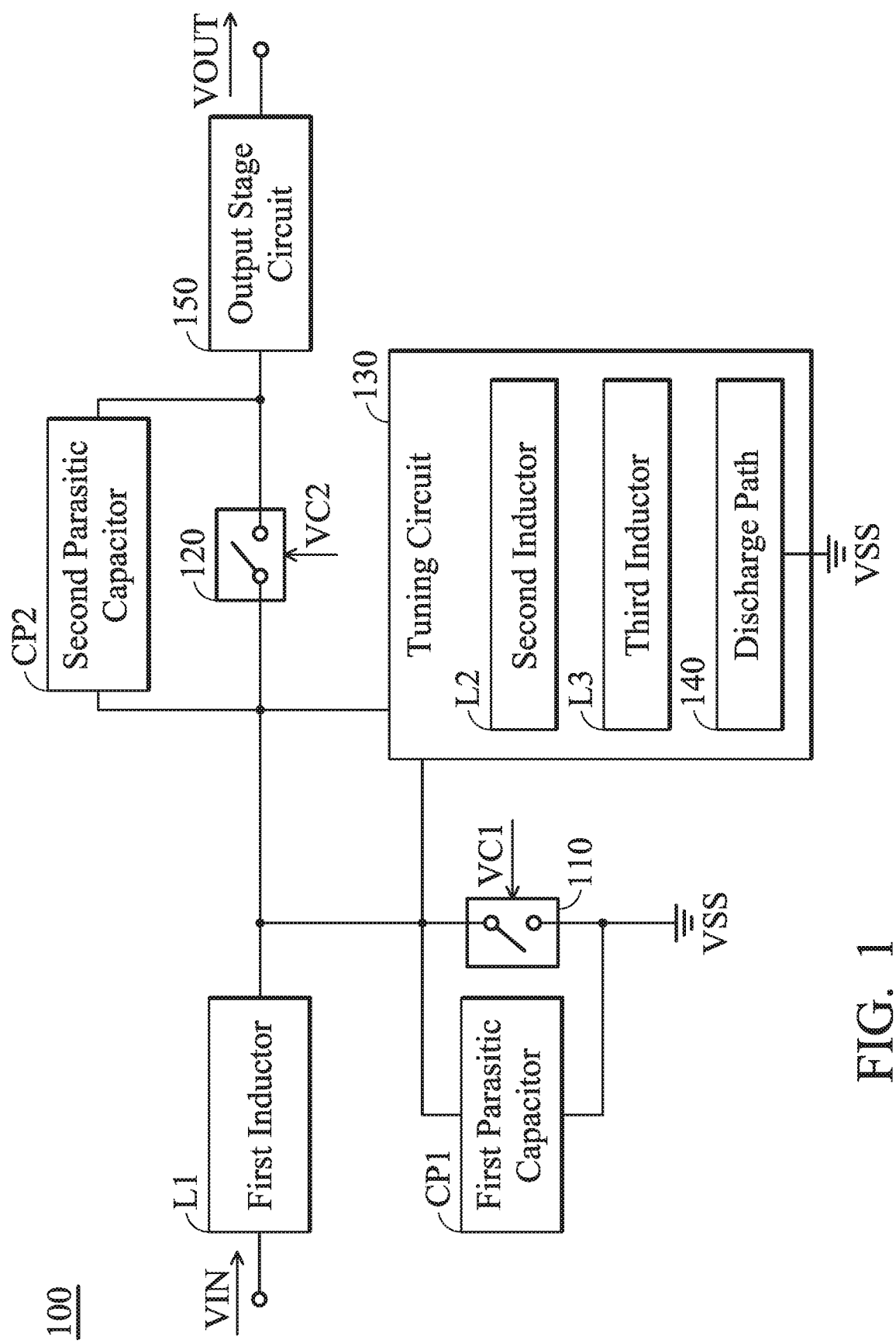
FIG. 1 is a diagram of a boost converter according to an embodiment of the invention.

FIG. 1 is a diagram of a boost converter 100 according to an embodiment of the invention. The boost converter 100 may be applied to a mobile device, such as a desktop computer, a notebook computer, or an all-in-one computer. As shown in FIG. 1, the boost converter 100 includes a first inductor L1, a first switch element 110, a second switch element 120, a tuning circuit 130, and an output stage circuit 150. A first parasitic capacitor CP1 is built in the first switch element 110. A second parasitic capacitor CP2 is built in the second switch element 120. The tuning circuit 130 includes a second inductor L2, a third inductor L3, and a discharge path 140. It should be noted that the boost converter 100 may further include other components, such as a voltage regulator and/or a negative feedback circuit, although they are not displayed in FIG. 1.

The first inductor L1 is considered as a boost inductor of the boost converter 100. The first inductor L1 is configured to receive an input voltage VIN. The input voltage VIN may be from an external power source. The input voltage VIN may be an AC (Alternating Current) voltage with any frequency and any magnitude. For example, the frequency of the AC voltage may be about 50 Hz or 60 Hz, and the RMS (Root-Mean-Square) value of the AC voltage may be about 110V or 220V, but they are not limited thereto. The first switch element 110 selectively couples the first inductor L1 to a ground voltage VSS (e.g., 0V) according to a first control voltage VC1. For example, if the first control voltage VC1 has a high logic level (e.g., logic "1"), the first switch element 110 may couple the first inductor L1 to the ground voltage VSS (i.e., the first switch element 110 may almost be a short-circuited path). Conversely, if the first control voltage VC1 has a low logic level (e.g., logic "0"), the first switch element 110 may not couple the first inductor L1 to the ground voltage VSS (i.e., the first switch element 110 may almost be an open-circuited path). The total parasitic capacitance between two terminals of the first switch element 110 is modeled as the aforementioned first parasitic capacitor CP1, which is not an independent external component. When the boost converter 100 is initialized, the first control voltage VC1 may be maintained at a constant voltage. When the boost converter 100 is operating normally, the first control voltage VC1 can provide a periodical clock waveform. Similarly, the second switch element 120 selectively couples the first inductor L1 to the output stage circuit 150 according to a second control voltage VC2. For example, if the second control voltage VC2 has a high logic level, the second switch element 120 may couple the first inductor L1 to the output stage circuit 150 (i.e., the second switch element 120 may almost be a short-circuited path). Conversely, if the second control voltage VC2 has a low logic level, the second switch element 120 may not couple the first inductor L1 to the output stage circuit 150 (i.e., the second switch element 120 may almost be an open-circuited path). The total parasitic capacitance between two terminals of the second switch element 120 is modeled as the aforementioned second parasitic capacitor CP2, which is not an independent external component. The second control voltage VC2 and the first control voltage VC1 may have the same waveforms, but the phase difference between them may be substantially equal to 180 degrees. The tuning circuit 130 is coupled to the first switch element 110 and the second switch element 120, and it is configured to compensate for the first parasitic capacitor CP1 and the second parasitic capacitor CP2. The output stage circuit 150 is configured to generate an output voltage VOUT. The output voltage VOUT may be a DC (Direct Current) voltage. The voltage level of the output voltage VOUT may be higher than the maximum value of the input voltage VIN. Generally, the boost converter 100 can operate in a first mode or a second mode. In the first mode, the first parasitic capacitor CP1 resonates with the second inductor L2 and is coupled through the discharge path 140 to the ground voltage VSS. In the second mode, the second parasitic capacitor CP2 resonates with the third inductor L3 and is coupled through the discharge path 140 to the ground voltage VSS. According to practical measurements, such a circuit design can suppress non-ideal characteristics of the first parasitic capacitor CP1 and the second parasitic capacitor CP2, and also make the first switch element 110 and the second switch element 120 achieve almost lossless ZVS (Zero Voltage Switching) operations, thereby effectively increasing output efficiency of the boost converter 100.

The following embodiments will introduce the detailed structure and operation of the boost converter 100. It should be understood these figures and descriptions are merely exemplary, rather than limitations of the invention.

Figure 2:
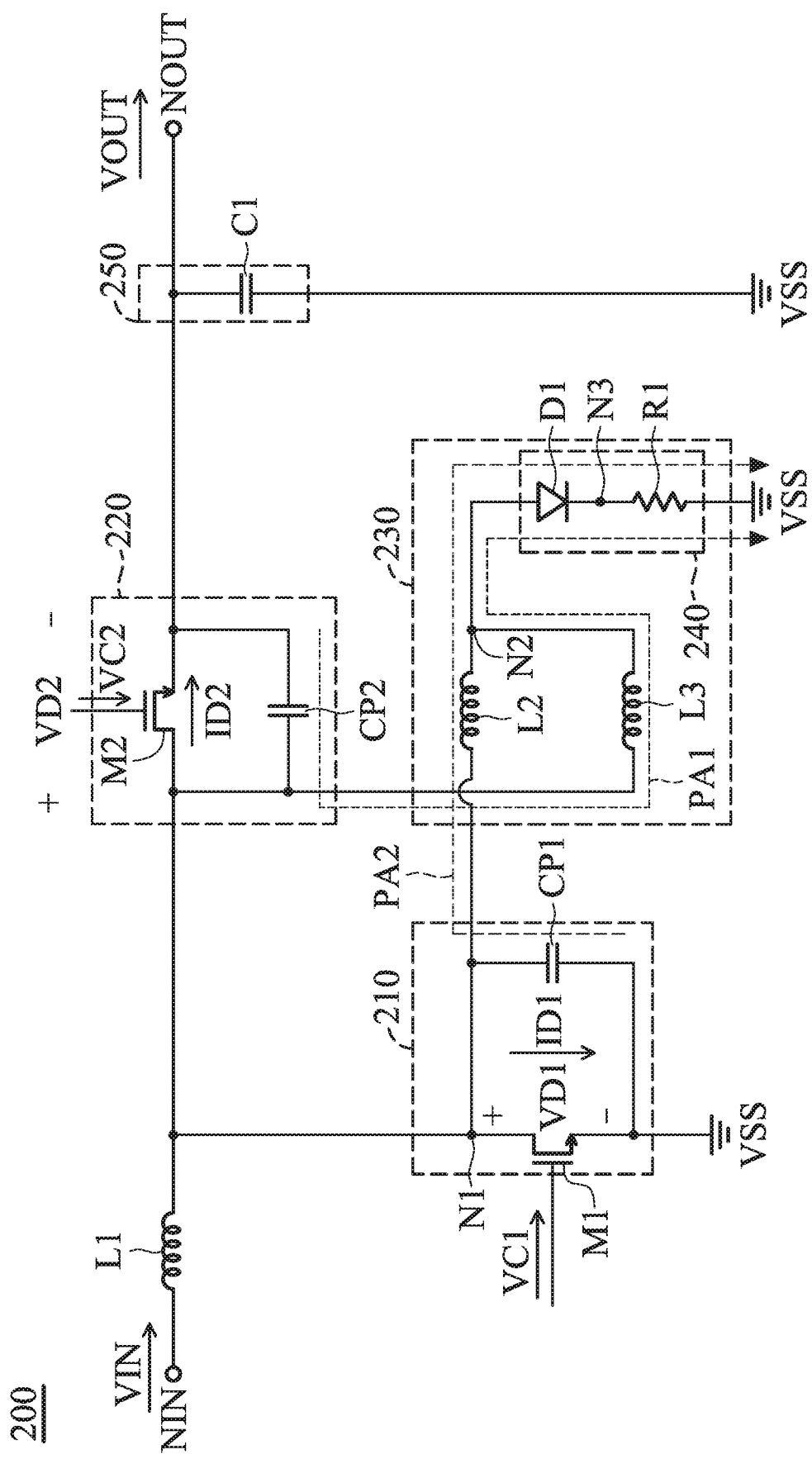
FIG. 2 is a diagram of a boost converter according to an embodiment of the invention.

FIG. 2 is a diagram of a boost converter 200 according to an embodiment of the invention. In the embodiment of FIG. 2, the boost converter 200 with an input node NIN and an output node NOUT includes a first inductor L1, a first switch element 210, a second switch element 220, a tuning circuit 230, and an output stage circuit 250. A first parasitic capacitor CP1 is built in the first switch element 210. A second parasitic capacitor CP2 is built in the second switch element 220. The tuning circuit 230 includes a second inductor L2, a third inductor L3, and a discharge path 240. The input node NIN of the boost converter 200 is arranged for receiving an input voltage VIN from an external power source. The output node NOUT of the boost converter 200 is arranged for outputting an output voltage VOUT. The voltage level of the output voltage VOUT may be higher than the maximum value of the input voltage VIN. In some embodiments, the first switch element 210 is considered as a main power switch of the boost converter 200, and the second switch element 220 is considered as a synchronous rectifying switch of the boost converter 200, but they are not limited thereto.

The first inductor L1 has a first terminal coupled to an input node NIN, and a second terminal coupled to a first node N1.

The first switch element 210 includes a first transistor M1. The first transistor M1 may be an NMOS transistor (N-type Metal Oxide Semiconductor Field Effect Transistor). The first transistor M1 has a control terminal for receiving a first control voltage VC1, a first terminal coupled to a ground voltage VSS, and a second terminal coupled to the first node N1. For example, when the boost converter 200 is initialized, the first control voltage VC1 may be maintained at a constant voltage (e.g., the ground voltage VSS). When the boost converter 200 is operating normally, the first control voltage VC1 can provide a periodical clock waveform. The total parasitic capacitance between the first terminal and the second terminal of the first transistor M1 is modeled as the aforementioned first parasitic capacitor CP1, which is not an independent external component. The first parasitic capacitor CP1 has a first terminal coupled to the first node N1, and a second terminal coupled to the ground voltage VSS.

The second switch element 220 includes a second transistor M2. The second transistor M2 may be an NMOS transistor. The second transistor M2 has a control terminal for receiving a second control voltage VC2, a first terminal coupled to the output node NOUT, and a second terminal coupled to the first node N1. For example, the second control voltage VC2 and the first control voltage VC1 may have the same waveforms, but the phase difference between them may be substantially equal to 180 degrees. The total parasitic capacitance between the first terminal and the second terminal of the second transistor M2 is modeled as the aforementioned second parasitic capacitor CP2, which is not an independent external component. The second parasitic capacitor CP2 has a first terminal coupled to the first node N1, and a second terminal coupled to the output node NOUT.

The output stage circuit 250 includes a capacitor C1. The capacitor C1 has a first terminal coupled to the output node NOUT, and a second terminal coupled to the ground voltage VSS.

In the tuning circuit 230, the second inductor L2 is coupled in parallel with the third inductor L3. Specifically, the second inductor L2 has a first terminal coupled to the first node N1, and a second terminal coupled to a second node N2. The third inductor L3 has a first terminal coupled to the first node N1, and a second terminal coupled to the second node N2.

The discharge path 240 of the tuning circuit 230 includes a diode D1 and a resistor R1. The diode D1 has an anode coupled to the second node N2, and a cathode coupled to a third node N3. The resistor R1 has a first terminal coupled to the third node N3, and a second terminal coupled to the ground voltage VSS. In some embodiments, the resistor R1 has a relatively large resistance, such that a total impedance value of the discharge path 240 is relatively high.

In some embodiments, the boost converter 200 operates in a first mode and a second mode alternately, and the details of its operations can be described as follows:

In the first mode, the first control voltage VC1 has a high logic level and the second control voltage VC2 has a low logic level, and thus the first transistor M1 is enabled and the second transistor M2 is disabled. At this time, the second parasitic capacitor CP2 resonates with the third inductor L3, and then the second parasitic capacitor CP2 is completely discharged via the discharge path 240 (as indicated by a first current path PA1). It should be noted that in the first mode, there is almost no current flowing through the second inductor L2 since the turned-on resistance of the enabled first transistor M1 is much smaller than the resistance of the resistor R1.

In the second mode, the first control voltage VC1 has a low logic level and the second control voltage VC2 has a high logic level, and thus the first transistor M1 is disabled and the second transistor M2 is enabled. At this time, the first parasitic capacitor CP1 resonates with the second inductor L2, and then the first parasitic capacitor CP1 is completely discharged via the discharge path 240 (as indicated by a second current path PA2). It should be noted that in the second mode, there is almost no current flowing through the third inductor L3 since the turned-on resistance of the enabled second transistor M2 is much smaller than the resistance of the resistor R1.

Figure 3A:
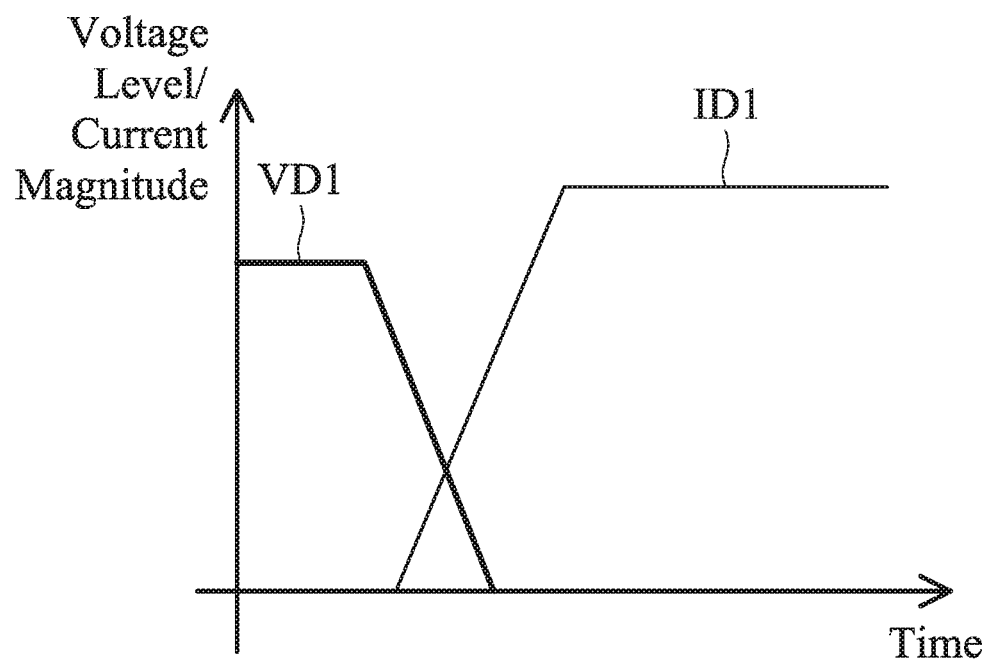
FIG. 3A is a diagram of voltage waveforms of a boost converter without any tuning circuit.

FIG. 3A is a diagram of voltage waveforms of the boost converter 200 without the tuning circuit 230. The horizontal axis represents time, and the vertical axis represents voltage level or current magnitude. As shown in FIG. 3A, if the tuning circuit 230 is not in used, the first parasitic capacitor CP1 of the first switch element 210 will store some charges. When the first switch element 210 is switched from a disable state into an enable state, a first current ID1 flowing through the first transistor M1 rises from 0, but a first voltage difference VD1 between the first terminal and the second terminal of the first parasitic capacitor CP1 has not fallen to 0. Thus, the first switch element 210 may have unwanted energy loss.

Figure 3B:
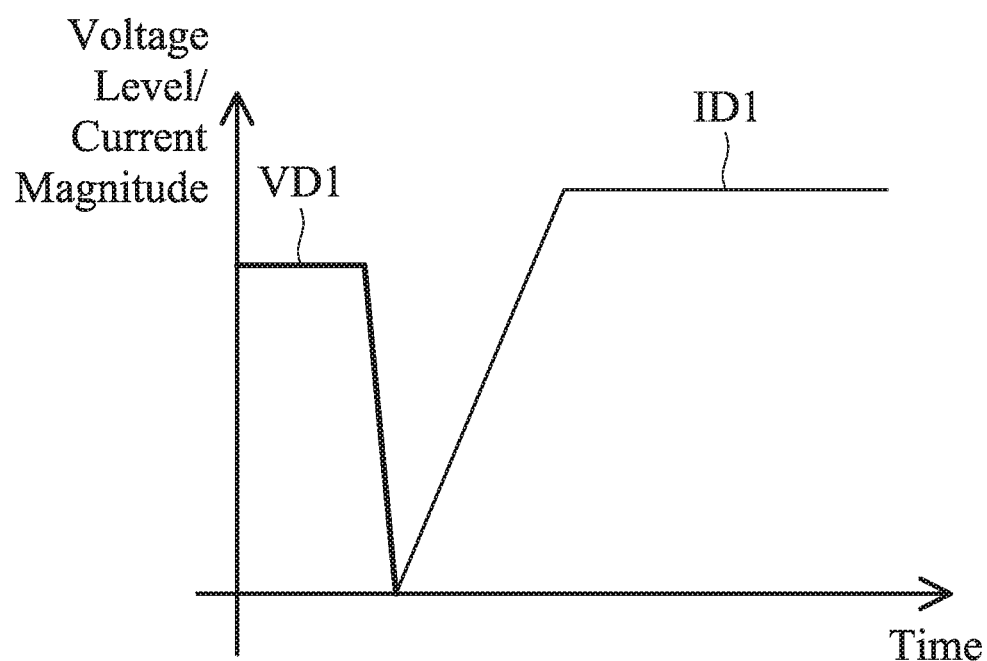
FIG. 3B is a diagram of voltage waveforms of a boost converter (with a tuning circuit) according to an embodiment of the invention.

FIG. 3B is a diagram of voltage waveforms of the boost converter 200 (with the tuning circuit 230) according to an embodiment of the invention. The horizontal axis represents time, and the vertical axis represents voltage level or current magnitude. As shown in FIG. 3B, if the tuning circuit 230 is in use, the non-ideal characteristic of the first parasitic capacitor CP1 will be effectively suppressed. When the first switch element 210 is switched from the disable state into the enable state, the first voltage difference VD1 between the first terminal and the second terminal of the first parasitic capacitor CP1 has been completely discharged to 0. Thus, the first switch element 210 can achieve an almost lossless ZVS operation.

Figure 4A:
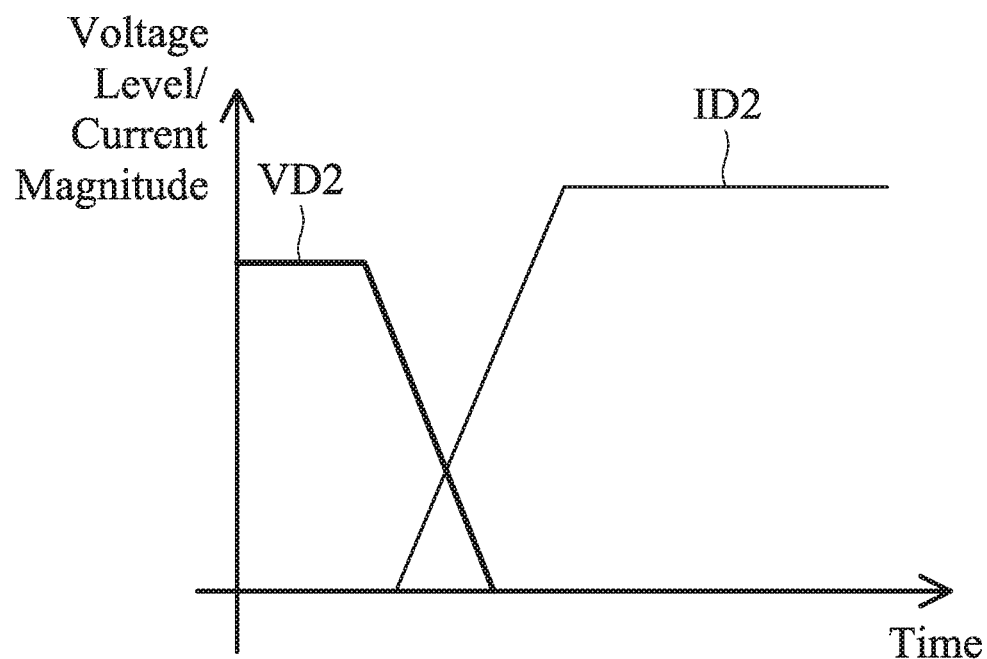
FIG. 4A is a diagram of voltage waveforms of a boost converter without any tuning circuit.

FIG. 4A is a diagram of voltage waveforms of the boost converter 200 without the tuning circuit 230. The horizontal axis represents time, and the vertical axis represents voltage level or current magnitude. As shown in FIG. 4A, if the tuning circuit 230 is not in used, the second parasitic capacitor CP2 of the second switch element 220 will store some charges. When the second switch element 220 is switched from a disable state into an enable state, a second current ID2 flowing through the second transistor M2 rises from 0, but a second voltage difference VD2 between the first terminal and the second terminal of the second parasitic capacitor CP2 has not fallen to 0. Thus, the second switch element 220 may have unwanted energy loss.

Figure 4B:
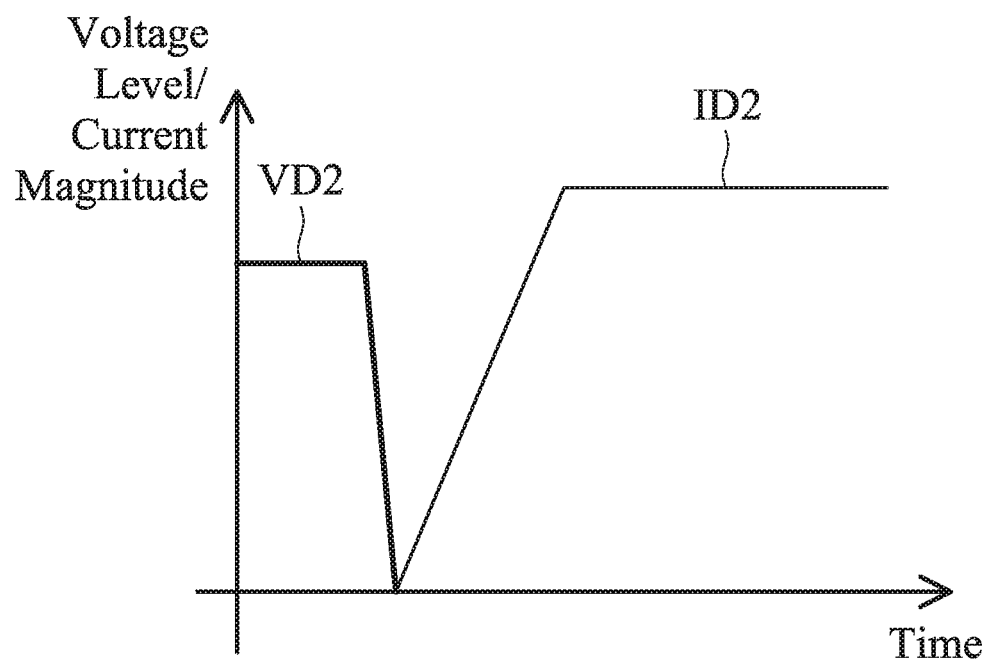
FIG. 4B is a diagram of voltage waveforms of a boost converter (with a tuning circuit) according to an embodiment of the invention.

FIG. 4B is a diagram of voltage waveforms of the boost converter 200 (with the tuning circuit 230) according to an embodiment of the invention. The horizontal axis represents time, and the vertical axis represents voltage level or current magnitude. As shown in FIG. 4B, if the tuning circuit 230 is in use, the non-ideal characteristic of the second parasitic capacitor CP2 will be effectively suppressed. When the second switch element 220 is switched from the disable state into the enable state, the second voltage difference VD2 between the first terminal and the second terminal of the second parasitic capacitor CP2 has been completely discharged to 0. Thus, the second switch element 220 can achieve an almost lossless ZVS operation.

In some embodiments, the element parameters of the boost converter 200 are described as follows: The capacitance of the first parasitic capacitor CP1 may be from 142.5 pF to 157.5 pF, such as 150 pF. The capacitance of the second parasitic capacitor CP2 may be from 142.5 pF to 157.5 pF, such as 150 pF. The capacitance of the capacitor C1 may be from 612 µF to 748 µF, such as 680 µF. The inductance of the second inductor L2 may be from 19 µH to 21 µH, such as 20 µF. The inductance of the third inductor L3 may be from 19 µH to 21 µH, such as 20 µF. The resistance of the resistor R1 may be from 22.5 MΩ to 27.5 MΩ, such as 25 MΩ. The switching frequency of each of the first control voltage VC1 and the second control voltage VC2 may be about 65 kHz. The above ranges of parameters are calculated and obtained according to the results of many experiments, and they help to optimize the conversion efficiency of the boost converter 200.

The invention proposes a novel boost converter which includes a tuning circuit and a discharge path thereof. According to practical measurements, the boost converter using the aforementioned design can eliminate non-ideal parasitic capacitances of switch elements, thereby achieving almost lossless ZVS operations. Generally, the invention can effectively increase the output efficiency of the boost converter, and it is suitable for application in a variety of electronic devices.

Note that the above voltages, currents, resistances, inductances, capacitances and other element parameters are not limitations of the invention. A designer can adjust these parameters according to different requirements. The boost converter of the invention is not limited to the configurations of FIGS. 1-4. The invention may merely include any one or more features of any one or more embodiments of FIGS. 1-4. In other words, not all of the features displayed in the figures should be implemented in the boost converter of the invention. Although the embodiments of the invention use MOSFET as examples, the invention is not limited thereto, and those skilled in the art may use other types of transistors, such as BJT (Bipolar Junction Transistor), JFET (Junction Gate Field Effect Transistor), FinFET (Fin Field Effect Transistor), etc., without affecting the performance of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered exemplary only, with a true scope of the disclosed embodiments being indicated by the following claims and their equivalents.

What is claimed is:

1. A boost converter, comprising:
   a first inductor, receiving an input voltage;
   a first switch element, wherein a first parasitic capacitor is built in the first switch element, and the first switch element selectively couples the first inductor to a ground voltage according to a first control voltage;
   an output stage circuit, generating an output voltage;
   a second switch element, wherein a second parasitic capacitor is built in the second switch element, and the second switch element selectively couples the first inductor to the output stage circuit according to a second control voltage; and
   a tuning circuit, comprising a second inductor, a third inductor, and a discharge path, wherein the first parasitic capacitor resonates with the second inductor and is coupled through the discharge path to the ground voltage, or wherein the second parasitic capacitor resonates with the third inductor and is coupled through the discharge path to the ground voltage;
   wherein the first inductor has a first terminal coupled to an input node for receiving the input voltage, and a second terminal coupled to a first node;
   wherein the second inductor has a first terminal coupled to the first node, and a second terminal coupled to a second node;
   wherein the third inductor has a first terminal coupled to the first node, and a second terminal coupled to the second node.

2. The boost converter as claimed in claim 1, wherein the first switch element comprises:
   a first transistor, wherein the first transistor has a control terminal for receiving the first control voltage, a first terminal coupled to the ground voltage, and a second terminal coupled to the first node.

3. The boost converter as claimed in claim 2, wherein the output stage circuit comprises:
   a capacitor, wherein the capacitor has a first terminal coupled to an output node for outputting the output voltage, and a second terminal coupled to the ground voltage.

4. The boost converter as claimed in claim 3, wherein the second switch element comprises:
   a second transistor, wherein the second transistor has a control terminal for receiving the second control voltage, a first terminal coupled to the output node, and a second terminal coupled to the first node.

5. The boost converter as claimed in claim 4, wherein the second parasitic capacitor has a first terminal coupled to the first node, and a second terminal coupled to the output node.

6. The boost converter as claimed in claim 4, wherein when the first transistor is enabled and the second transistor is disabled, the second parasitic capacitor resonates with the third inductor and is completely discharged via the discharge path.

7. The boost converter as claimed in claim 6, wherein when the first transistor is disabled and the second transistor is enabled, the first parasitic capacitor resonates with the second inductor and is completely discharged via the discharge path.

8. The boost converter as claimed in claim 4, wherein the discharge path comprises:
   a diode, wherein the diode has an anode coupled to the second node, and a cathode coupled to a third node.

9. The boost converter as claimed in claim 8, wherein the discharge path further comprises:
   a resistor, wherein the resistor has a first terminal coupled to the third node, and a second terminal coupled to the ground voltage.

10. The boost converter as claimed in claim 9, wherein a resistance of the resistor is from 22.5 MΩ to 27.5 MΩ.

11. The boost converter as claimed in claim 3, wherein a capacitance of the capacitor is from 612 μF to 748 μF.

12. The boost converter as claimed in claim 1, wherein the first parasitic capacitor has a first terminal coupled to the first node, and a second terminal coupled to the ground voltage.

* * * * *